April 5, 1966   J. W. CARNER   3,244,339
PIPE CUTTER

Filed Jan. 17, 1964   3 Sheets-Sheet 1

INVENTOR.
JOHN W. CARNER

BY *Edward A. Sokolski*

ATTORNEY

April 5, 1966     J. W. CARNER     3,244,339
PIPE CUTTER

Filed Jan. 17, 1964     3 Sheets-Sheet 2

INVENTOR.
JOHN W. CARNER

BY *Edward A. Sokolski*

ATTORNEY

April 5, 1966 J. W. CARNER 3,244,339
PIPE CUTTER

Filed Jan. 17, 1964 3 Sheets-Sheet 3

INVENTOR.
JOHN W. CARNER
BY Edward A. Sokolski
ATTORNEY

United States Patent Office 3,244,339
Patented Apr. 5, 1966

3,244,339
PIPE CUTTER
John W. Carner, 1518 Walgrove, Los Angeles, Calif.
Filed Jan. 17, 1964, Ser. No. 338,349
11 Claims. (Cl. 225—104)

This invention relates to a pipe cutter and more particularly to such a device utilizing a link chain cutting element.

Pipe cutters utilizing chain cutting elements are used quite extensively in the plumbing industry to cut pipe in the field to a desired size. Such devices tend to be of two general types. In one type of cutter, cutting wheels or discs oscillate back and forth over the surface of the pipe until the walls have been cut through. In another type of device of the prior art, the pipe is squeezed by a cutting chain which is operated by a pair of clamping jaws.

These devices of the prior art have several limitations. Firstly, due to the nature of their construction, they are only suitable for cutting pipes of a limited diameter. Secondly, most of the devices depend upon purely mechanical leverage and require the expenditure of a substantial amount of energy by the operator. Further with such devices of the prior art, it takes a fair amount of time to set the cutting chain in place for each cutting operation. This operating time, while not of any great significance where a small number of pipe cuts are required, mounts up considerably in a large scale construction project where many hundreds or thousands of cuts must be made.

The device of this invention overcomes the shortcomings of the prior art in providing a chain pipe cutter utilizing a stand on which the pipe is supported. The chain is detachably anchored near one end thereof to the stand and squeezed around the pipe to cut therethrough by means of a pneumatically or hydraulically actuated piston to which the chain is connected. The force for the cutting action is thus provided pneumatically or hydraulically and the operator need merely close a switch to cause the device to operate. Further, operations can be performed very rapidly in that the pipe to be cut is supported on the stand and the cutting chain then wrapped therearound by a single simple operation. Means are provided for adjusting the stand to accommodate various size pipes.

It is therefore an object of this invention to provide an improved pipe cutter.

It is a further object of this invention to provide a pipe cutter utilizing an adjustable pipe support stand which is capable of more rapid utilization than prior art devices.

It is still a further object of this invention to facilitate the cutting of pipe in large scale operations.

It is still another object of this invention to provide an improved pipe cutter having a power drive which is easy to operate and which requires little effort on the part of the operator.

It is still a further object of this invention to provide a pipe cutter capable of cutting larger diameter pipe than prior art devices.

Other objects of this invention will become apparent from the following description taken in connection with the accompanying drawings of which:

Figure 1:
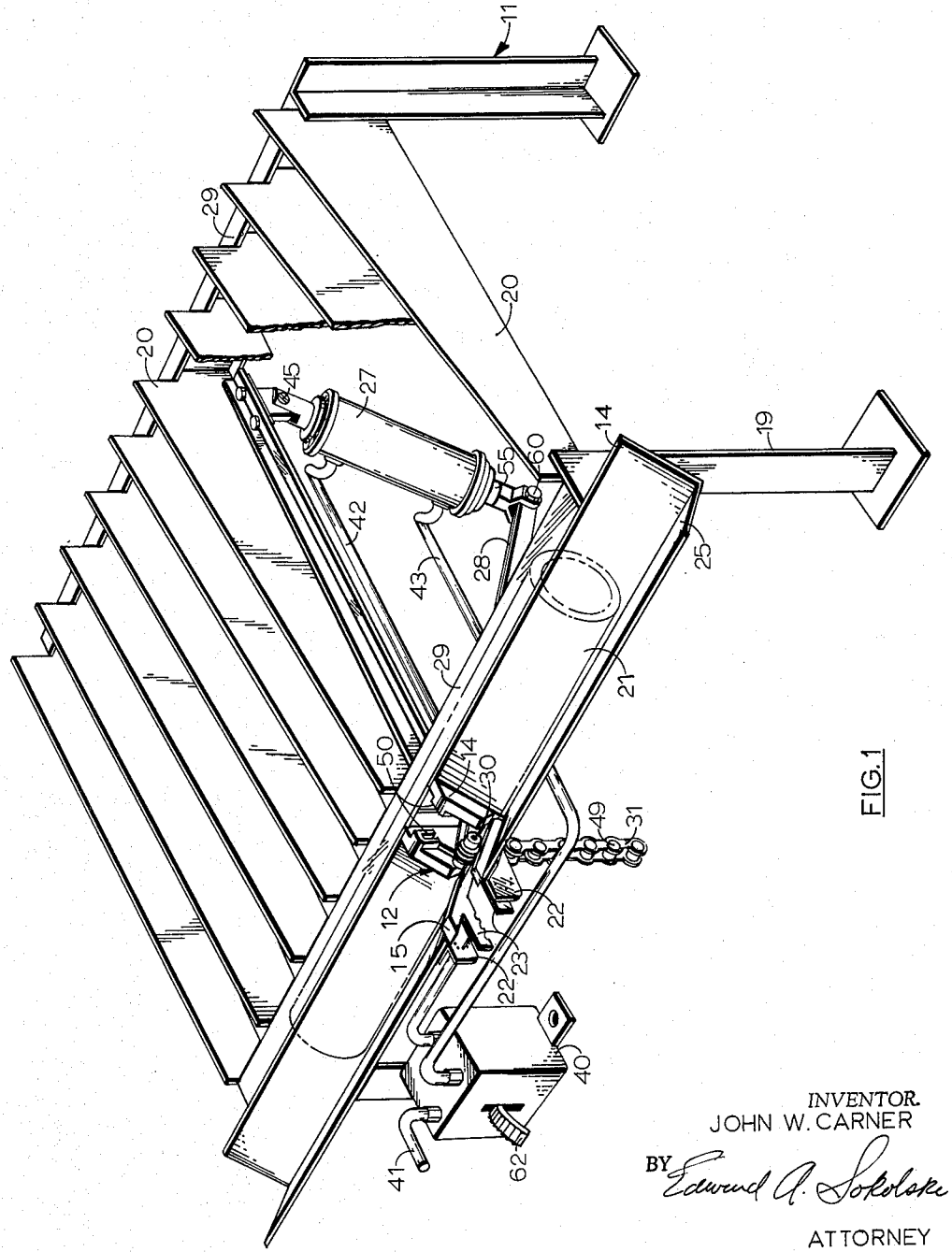
FIG. 1 is a perspective view of a first embodiment of the device of the invention.
Figure 2:
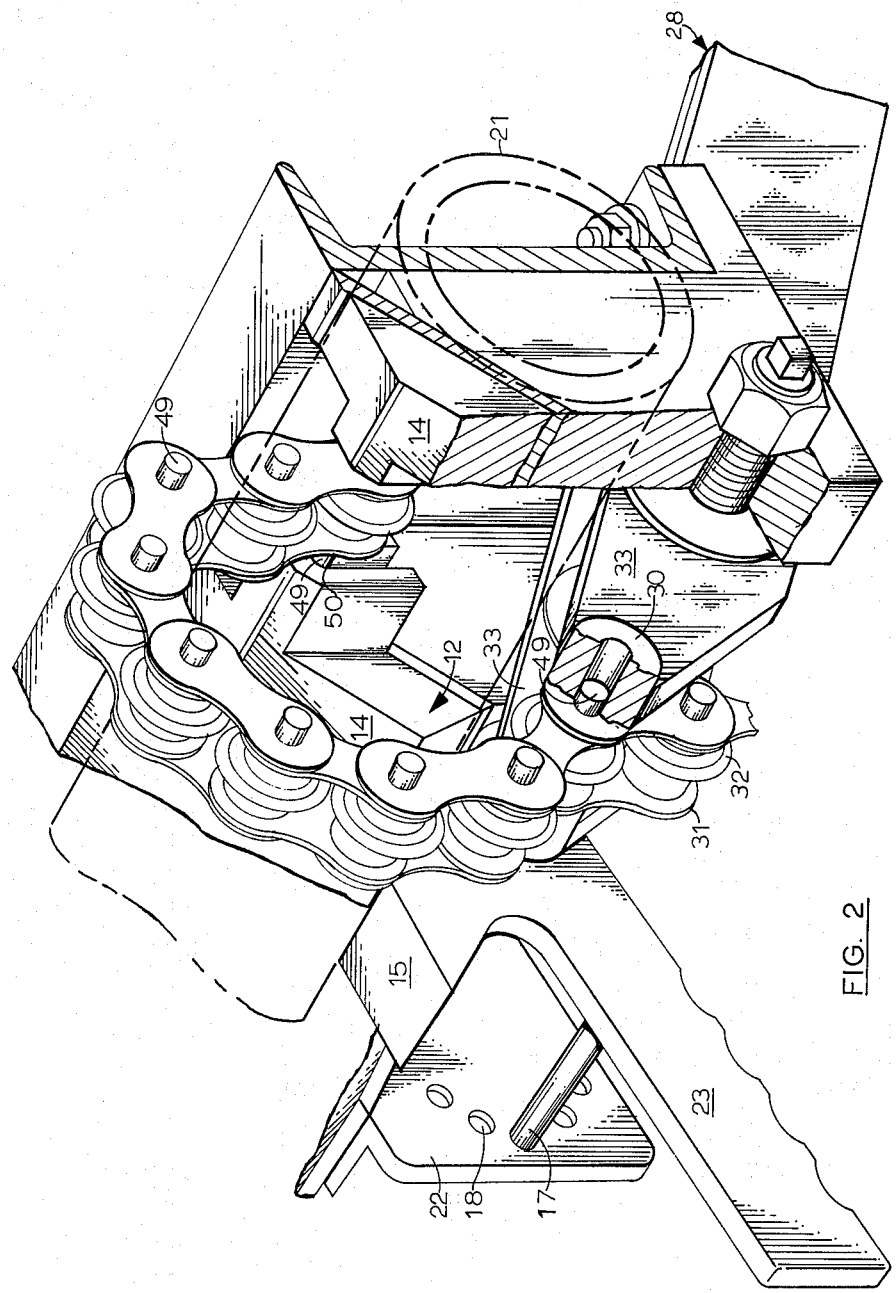
FIG. 2 is a perspective view with partial cutaway section showing the details of the chain cutting mechanism utilized in the embodiment illustrated in FIG. 1.

Referring now to FIGS. 1 and 2, a first embodiment of the device of the invention is illustrated. In FIG. 1, chain 31 is shown hanging down in the position it falls to immediately after pipe has been cut.

A pipe to be cut 21 is placed on V-shaped support 12. V-shaped support 12 includes a pair of fixed legs 14 which are each fixedly attached to one of V-shaped trays 25 and a pair of movable legs 15 mounted for pivotal motion about the vertex of the V. Legs 15 are hingedly attached to fixed legs 14 by means of hinge members (not shown). Stand 11 has a frame-type construction and includes legs 19 which are joined by cross bars 29. Cross bars 29 are joined together by a plurality of cross plates 20. Trays 25 are fixedly attached to stand 11.

Movable legs 15 are positioned by means of handles 23. Handles 23 have detent pins 17 fixedly attached thereto, each of which engages one of detents 18 formed in plates 22. Plates 22 are fixedly attached to stand 11. Arms 23 are somewhat resilient so that they can be squeezed towards each other, to permit the selective engagement of pins 17 with detents 18 to position V legs 15 to one of several positions. In this fashion, the angle formed by the vertex of the V can be selectively adjusted to accommodate various sizes of pipe 21. Chain 31 is a link chain having a plurality of pivot pins 49 establishing pivot points therefor. Pivot pins 49 extend outwardly from the sides of the chain and are utilized to join such chain to stand 11 and bell crank 28.

Power is provided for performing the cutting action by means of cylinder 27 which may be of either the pneumatic or hydraulic variety. Cylinder 27 is pivotally mounted on stand 11 by means of bolt 45.

The cutting action is accomplished by actuating foot pedal 62 of control box 40. This causes pressurized fluid flowing to control box 40 through line 41 from a fluid source (not shown) to enter cylinder 27 through line 42, thereby driving the piston 55 of the cylinder downward. A fluid return from cylinder 27 is provided through line 43. Piston 55 is pivotally connected to bell crank 28 by means of bolt 60.

Referring particularly to FIG. 2, the device of the invention is operated as follows: With the pipe to be cut 21 supported by V support 12, the pins 49 of the last link of one end of the chain are inserted in oppositely positioned U-shaped slots 50 formed in V leg 14. The chain is then wrapped around the pipe as shown in FIG. 2, with rotatable cutter wheels 32 abutting against the wall of such pipe. Pivot pin receptacles 30 are fixedly attached to the ends of bell crank 28. The pivot pin 49 of the chain link which falls closest to receptacles 30 is inserted in those receptacles by slightly separating the resilient ends of the bell crank. Pin 49 is allowed to snap firmly in position in receptacles 30. The remaining links of chain 31 which are not wrapped around the pipe fall down between the arms of the bell crank. Pedal 62 is then actuated causing piston 55 to be driven downward thereby rotating bell crank 28. With the rotation of bell crank 28, the cutter wheels 32 of chain 31 are drawn tightly against the sides of pipe 21 eventually cutting completely therethrough. An operative embodiment of the device of the invention has been used to equal effect in cutting through both ceramic soil pipes and metal pipes of various diameters.

Figure 3:
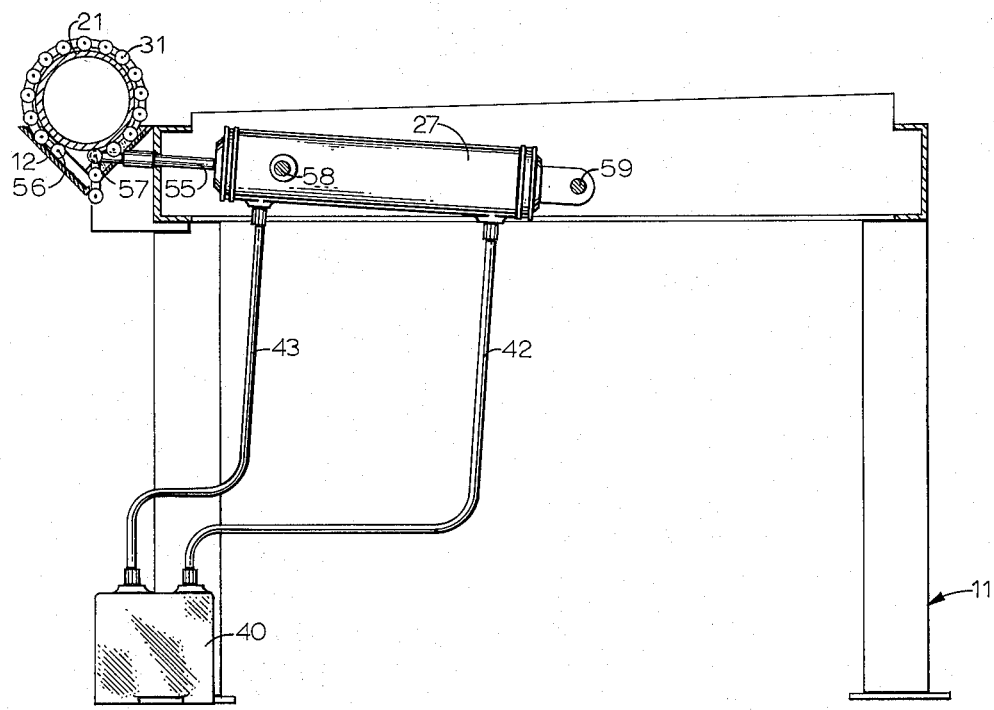
FIG. 3 is an elevation view partially in cross section of a second embodiment of the device of the invention.

Referring now to FIG. 3, a second embodiment of the device of the invention is illustrated. This second embodiment functions in the same general fashion and has the same general construction as the embodiment of FIGS. 1 and 2, except for the fact that in place of the bell crank a direct piston drive is utilized and the power drive is applied from the opposite end of the chain.

Cylinder 27 is fixedly attached to stand 11 by means of bolts 58 and 59. Control box 40 operates in the same fashion as the control box described in connection with FIG. 1 to provide fluid actuation for the cylinder. One end 56 of chain 31 is detachably connected to fixed V arms 12 which are fixedly attached to stand 11. Such attachment is accomplished in the same fashion as described in connection with FIG. 2 with the pivot pins of the chain being held in a slotted member. Chain 31 is wrapped around pipe 21. The chain is also removably attached to the end of piston rod 55 in the same general fashions as described in connection with FIG. 2, the end of piston 55 having a pair of resilient arms and receptacles similar in configuration to the arms 33 and receptacles 30 illustrated in FIG. 2. When the lever (not shown) of control box 40 is actuated, piston 55 is driven out of cylinder 27 (to the left) wrapping chain 31 tightly around the pipe and causing the cutter wheels thereon (similar in configuration to those described in connection with FIGS. 1 and 2) to cut through the pipe. Chain 31 of the embodiment of FIG. 3 is substantially identical in construction to the chain 31 shown in FIG. 2.

It should be clearly understood that the various embodiments of the device of the invention can be varied so that either one or the other end of the chain is the one attached to the stand, with the power drive being applied either as in FIG. 2 to drive the chain from left to right or as in FIG. 3 to drive the chain from right to left.

The device of the invention thus provides a simple yet highly efficient means for cutting pipe. The cutting operation can be performed with the device of the invention in a minimum amount of time and with a minimum expenditure of effort by the operator.

While the device of the invention has been described and illustrated in detail, it is to be clearly understood that this is intended by way of illustration and example only and is not to be taken by way of limitation, the spirit and scope of the invention being limited only by the terms of the following claims.

I claim:
1. In a pipe cutter,
   support means for supporting a pipe to be cut, said support means including a stand and a pair of V-shaped supports attached to one end of said stand, said V-shaped supports being separated from each other and alined with each other along an axis parallel to said one end of said stand,
   drive means fixedly attached to said stand, said drive means having a linear drive rod,
   a cutting chain having a plurality of cutting wheels therein,
   means for detachably connecting one end of said chain to said V-shaped supports,
   means for connecting said chain near the other end thereof to said drive rod at a position located in the space between said V-shaped supports, and
   means for actuating said drive means,
   whereby said chain is wrapped tightly around the pipe to be cut causing said cutting wheels to cut therethrough.
2. The pipe cutter as recited in claim 1 wherein said drive means includes a fluid actuated cylinder.
3. The pipe cutter as recited in claim 1 wherein said cutting chain includes a plurality of links joined together by pivot pins and said means for connecting said chain to said supports includes slots formed in said supports, one of said pins being fitted into said slots.
4. The device as recited in claim 1 wherein said means for connecting said chain to said drive rod comprises a pair of resilient arms attached to said drive rod and a pair of receptacles attached to the ends of said arms, one of said pins being fitted into said receptacles.
5. In a device for cutting pipe,
   a stand having a cross bar along one edge thereof,
   a pair of similar V-shaped trays fixedly attached to said cross bar, said trays running along an axis substantially parallel to said cross bar and being separated by a predetermined space,
   a separate V-shaped support attached to each of said trays at the inner end thereof, each of said supports having a slot formed therein near the top end of one of the legs thereof,
   a drive cylinder mounted on said stand, said cylinder having a linear drive rod,
   a drive shaft fixedly attached to the end of said drive rod, said drive shaft including a pair of resilient forked arms, said drive shaft being positioned along an axis substantially normal to the longitudinal axes of said trays and located in a plane lying in said predetermined space between said trays,
   a link chain having a plurality of cutting wheels therein, said chain further having a plurality of pivot pins joining the links thereof together,
   receptacle means fixedly attached to each of the arms of said drive shaft for retaining a selected one of the pins of said chain, and
   means for actuating said cylinder,
   said chain being wrapped around said pipe, a pivot pin near one end thereof engaging the slots in said supports and a pivot pin near the other end thereof engaging said receptacle means.
6. In a device for cutting pipe,
   a stand having a cross bar along one upper edge thereof, said cross bar running along substantially the entire longitudinal extent of said stand,
   a pair of similar V-shaped trays fixedly attached to said cross bar, said trays running in substantially the same direction as said cross bar and being separated from each other by a predetermined space,
   a V-shaped support attached to each of said trays at the ends thereof, said supports facing each other across said predetermined space, said supports each including one V leg pivotally mounted with respect to the other V leg thereof, each of said supports having a slot formed therein near the top end of one of the legs thereof,
   a drive cylinder mounted on said stand, said cylinder having a linear drive rod,
   a drive shaft attached to the end of said drive rod, said drive shaft including a pair of resilient bifurcated arms, said drive shaft being positioned along an axis substantially normal to the longitudinal axes of said trays and located in a plane lying in said predetermined space between said trays,
   a link chain having a plurality of cutting wheels therein, said chain further having a plurality of pivot pins joining the links thereof together,
   receptacle means fixedly attached to each of the arms of said drive shaft for retaining a selected one of the pins of said chain, and
   means for actuating said cylinder,
   said chain being wrapped around said pipe, a pivot pin near one end thereof engaging the slots in said supports and a pivot pin near the other end thereof engaging said receptacle means.
7. The device as recited in claim 6 wherein said drive shaft comprises a bell crank, one end of said bell crank being pivotally attached to said drive rod.
8. The device as recited in claim 6 wherein said means for actuating said cylinder includes a fluid control device.
9. A device for cutting through pipe comprising
   a stand having a cross bar running along one end thereof,
   a pair of V-shaped trays fixedly attached to said cross bar, said trays being separated from each other and positioned along an axis parallel to the longitudinal axis of said cross bar,
   a V-shaped support attached to each of said trays at the edges thereof facing each other, one of the legs of the V's formed by each of said supports being mounted pivotally relative to the other of said legs,
   means for pivotally positioning said ones of said legs relative to the others of said legs, a link chain having a plurality of cutting wheels therein, and a pivot pin for rotatably supporting each of the links thereof, slot means formed in each of said V-shaped supports for receiving one of said pivot pins, drive means having receptacle means at one end thereof for receiving one of the pivot pins of said link chain, fluid drive means for linearly driving said drive means, one end of said drive means detachably engaging said receptacle means, and means for actuating said drive means whereby said chain is tightly drawn around the pipe to be cut to cause the cutting wheels therein to cut through said pipe.

10. The device as recited in claim 9 wherein said drive means comprises a pair of resilient forked arms, said receptacle means including a pair of oppositely positioned receptacles attached to the ends of said arms.

11. A device for cutting through pipe comprising a stand having a cross bar running along one end thereof, a pair of V-shaped support means fixedly attached to said cross bar, said support means being separated from each other and positioned along an axis parallel to the longitudinal axis of said cross bar, a link chain having a plurality of cutting wheels therein and a pivot pin for rotatably supporting each of the links thereof, slot means formed in each of said V-shaped support means for receiving one of said pivot pins, drive means including a pair of forked arms and a receptacle at one end of each of said arms for receiving one of the pivot pins of said link chain, said arms extending in a direction normal to the longitudinal axis of said cross bar, fluid drive means for linearly driving said drive means, one end of said drive means detachably engaging said receptacle means, and means for actuating said drive means, whereby said chain is tightly drawn around the pipe to be cut to cause the cutting wheels therein to cut through said pipe.

References Cited by the Examiner

UNITED STATES PATENTS

| | | | |
|---|---|---|---|
| 930,755 | 8/1909 | Holland | 30—100 X |
| 2,353,590 | 7/1944 | Schultz | 83—490 X |
| 2,822,710 | 2/1958 | Haiman | 269—294 X |
| 2,949,669 | 8/1960 | Wheeler | 225—103 |

WILLIAM W. DYER, Jr., *Primary Examiner.*